United States Patent
Dianda et al.

(10) Patent No.: US 7,369,558 B1
(45) Date of Patent: May 6, 2008

(54) ATM CONNECTION ALLOCATION IN ATM NETWORKS

(75) Inventors: Robert B. Dianda, Leawood, KS (US); Danmei Wu, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 694 days.

(21) Appl. No.: 10/822,973

(22) Filed: Apr. 13, 2004

(51) Int. Cl.
H04L 12/28 (2006.01)
H04J 1/16 (2006.01)
G08C 15/00 (2006.01)
G06F 11/00 (2006.01)

(52) U.S. Cl. ............... 370/395; 370/352; 370/468; 370/230

(58) Field of Classification Search ........ 370/230–352, 370/391–395, 401–468; 709/223–229
See application file for complete search history.

(56) References Cited

U.S. PATENT DOCUMENTS

| | | | |
|---|---|---|---|
| 6,515,964 B1 * | 2/2003 | Cheung et al. | 370/230 |
| 6,529,499 B1 * | 3/2003 | Doshi et al. | 370/352 |
| 6,625,155 B1 * | 9/2003 | Dziong | 370/395.2 |
| 6,690,678 B1 * | 2/2004 | Basso et al. | 370/468 |
| 6,697,369 B1 * | 2/2004 | Dziong et al. | 370/395.2 |
| 6,791,941 B1 * | 9/2004 | Dziong et al. | 370/229 |
| 6,798,745 B1 * | 9/2004 | Feinberg | 370/235 |
| 7,092,356 B2 * | 8/2006 | Rabie et al. | 370/230 |
| 7,120,114 B1 * | 10/2006 | Miyamoto | 370/230 |
| 7,151,781 B2 * | 12/2006 | MeLampy et al. | 370/468 |
| 7,236,483 B2 * | 6/2007 | Yeom | 370/352 |
| 2006/0251050 A1 * | 11/2006 | Karlsson | 370/352 |
| 2006/0285491 A1 * | 12/2006 | Miyamoto | 370/230 |

* cited by examiner

*Primary Examiner*—Man U. Phan

(57) ABSTRACT

A method of allocating ATM connections is described. The first step of the method includes determining a first bandwidth for the ATM connection based on a number of calls for the ATM connection and an estimated bandwidth per call. The estimated bandwidth per call corresponds to a maximum bandwidth required for a call. Another step includes determining an overbooking factor for the link over which the ATM connection will be allocated. Another step includes adjusting the first bandwidth based on the overbooking factor to determine a second bandwidth. Another step includes determining if the link has at least the second bandwidth available. Another step includes allocating the ATM connection for the second bandwidth if the link has at least the second bandwidth available. Another step includes denying the ATM connection if the link does not have at least the second bandwidth available.

18 Claims, 3 Drawing Sheets

ATM CONNECTION ALLOCATION IN ATM NETWORKS

BACKGROUND OF THE INVENTION

1. Field of the Invention

The invention is related to the field of communication systems, and in particular, to allocating ATM connections in ATM networks.

2. Statement of the Problem

Circuit-based networks use Time Division Multiplexing (TDM), Frequency Division Multiplexing (FDM), or other techniques to multiplex multiple calls onto a single physical link or medium. Multiplexing the calls increases the bandwidth available on the physical link. Packet-based networks, such as Asynchronous Transfer Mode (ATM) and Internet Protocol (IP) networks, also use multiplexing techniques to multiplex multiple calls onto a single physical link. For ATM networks, there may be two layers of multiplexing. One layer comprises multiplexing multiple calls on a physical link. The second layer comprises multiplexing multiple calls on a single ATM connection on the physical link.

Multiplexing calls on an ATM connection, along with using silence suppression in voice calls, results in a statistical gain in the average bandwidth needed for a call. The statistical gain depends on the number of calls to be multiplexed on the ATM connection. The statistical gain is higher when a large number of voice calls with silence suppression are multiplexed on the ATM connection, as the bandwidth per call is significantly less than would be needed without silence suppression. The statistical gain goes down as the number of voice calls multiplexed on the ATM connection goes down. As an extreme example, a single call on an ATM connection results in no statistical gain.

With packet-based networks being built, there is a need to interface the traditional circuit-based networks with the newer packet-based networks. For the interface, gateway devices are used to interwork data between the circuit-based networks and the packet-based networks. Gateway devices include media gateways and gateway controllers. For an ATM network, media gateways connect a switch in the TDM network to an ATM switch in the ATM network. The media gateways consequently convert formats between TDM format and ATM format to allow devices from the two networks to talk.

To understand the current state of the art, assume that a first gateway device, such as a media gateway, is coupled to a second gateway device in an ATM network by a DS-3 link. The first gateway device receives a call setup message for a call from the TDM network. The first gateway device processes the call setup message to determine that the call needs to be routed to the second gateway device over the DS-3 link. If there is an ATM connection already allocated between the first gateway device and the second gateway device over the DS-3 link, then the first gateway device performs a Connection Admission Control (CAC) function to determine if there is bandwidth available on the ATM connection or if there are sufficient resources to handle the call. If there is bandwidth available, then the first gateway device routes ATM cells, representing the call, to the second gateway device over the ATM connection.

If there is no ATM connection allocated between the first gateway device and the second gateway device, then the first gateway device requests an ATM connection over the DS-3 link. As part of the request for the ATM connection, the first gateway device requests a particular bandwidth for the ATM connection.

To determine the amount of bandwidth to request for the ATM connection, the first gateway device estimates the number of calls that will be routed over the ATM connection. The first gateway device also determines the average bandwidth per call, considering silence suppression, encoding, voice compression, fax calls, modem calls, etc. The first gateway device determines a low-end estimate of the needed bandwidth for the ATM connection by multiplying the number of calls and the average bandwidth per call.

The low-end estimate may not be a good estimate for the ATM connection, as bandwidth may not be reserved for up-speeding, such as for a fax or modem call. For instance, assume, in operation, that the low-end estimate is the actual bandwidth allocated to the ATM connection and the first gateway device multiplexes 24 calls on the ATM connection. If the $24^{th}$ call multiplexed on the ATM connection is a fax or modem call, then there most likely will not be enough bandwidth on the ATM connection for the fax or modem call. The actual bandwidth for a fax or modem call will be much higher than the average bandwidth per call assumed for the low-end estimate. Because there is insufficient bandwidth on the ATM connection, the first gateway device will drop the fax or modem call.

To solve this problem, the first gateway device adds additional bandwidth to the low-end estimate to determine the actual bandwidth to request for the ATM connection. The additional bandwidth builds a safety factor into the actual requested bandwidth so that the ATM connection can handle fax and modem calls, or other calls that exceed the average bandwidth of a call.

Once the actual requested bandwidth is determined, the first gateway device transmits a request for an ATM connection to the second gateway device along with the actual requested bandwidth for the ATM connection. Responsive to the request, the second gateway device determines if there is bandwidth available on the DS-3 link for the ATM connection. If the requested amount of bandwidth is not available, then the second gateway device does not allocate the ATM connection for the first gateway device. If the requested amount of bandwidth is available, then the second gateway device does allocate the ATM connection for the actual requested bandwidth.

After the second gateway device allocates the ATM connection, the first gateway device routes the call over the ATM connection. If bandwidth is allocated on the ATM connection for about 24 calls, then the first gateway device may multiplex up to 24 calls on the ATM connection. The first gateway device and the second gateway device actively police the ATM connection and the DS-3 link to ensure that the first gateway device is not exceeding the bandwidth of the ATM connection or the bandwidth of the DS-3.

Unfortunately, allocating ATM connections in the manner described above may not be efficient. The statistical gain achieved in an individual ATM connection is unfortunately dependent on the number of calls assumed for that ATM connection. The more calls being routed over the ATM connection, the higher the statistical gain, and the fewer calls being routed over the ATM connection, the lower the statistical gain. In the prior art method of allocating ATM connections, the estimated average bandwidth per call used to determine the bandwidth to request for the ATM connection is dependent on the number of calls assumed for that ATM connection. It may be advantageous to allocate ATM connections where the statistical gain is not dependent on the number of calls.

SUMMARY OF THE SOLUTION

The invention helps solve the above problems with methods and systems for allocating ATM connections, where the statistical gain does not depend on the number of calls on an ATM connection. The methods and systems embodying the invention assume an estimated bandwidth per call, when determining the bandwidth to request for an ATM connection, which corresponds to a maximum bandwidth for a call. The estimated bandwidth is not dependent on the number of calls that will be multiplexed on an ATM connection. Therefore, the methods and systems of the invention may more easily and efficiently allocate ATM connections.

One embodiment of the invention includes a method of allocating ATM connections. The first step of the method includes determining a first bandwidth for the ATM connection based on a number of calls for the ATM connection and an estimated bandwidth per call. The estimated bandwidth per call corresponds to a maximum bandwidth required for a call. For instance, a fax call or a modem call will need more bandwidth than a regular voice call, as there may be no silence in a fax or modem call. Thus, a maximum bandwidth required for a call may be the bandwidth required for a fax or modem call. With a maximum bandwidth identified, the estimated bandwidth corresponds to the maximum bandwidth by being approximately equal to the maximum bandwidth or within an acceptable range of the maximum bandwidth. The number of calls for the ATM connection may be the number of calls that will be multiplexed on the ATM connection. Another step of the method includes determining an overbooking factor for the link over which the ATM connection will be allocated. The overbooking factor may be determined in a conventional manner based on how much the link is to be "overbooked". The overbooking factor may be based on silence suppression, encoding, voice compression, or another factor. Another step of the method includes adjusting the first bandwidth based on the overbooking factor to determine a second bandwidth. Another step includes determining if the link has at least the second bandwidth available. Another step includes allocating the ATM connection for the second bandwidth if the link has at least the second bandwidth available. Another step includes denying the ATM connection if the link does not have at least the second bandwidth available.

Another embodiment of the invention includes a communication system that operates as follows. A gateway device receives a call from a non-ATM network. The gateway device processes the call and determines that the call should be routed to a communication device in an ATM network. The gateway device further determines that there is not an ATM connection allocated for routing the call, and an ATM connection needs to be allocated.

To get the ATM connection, the gateway device determines a first bandwidth to request for the ATM connection. The gateway device determines the first bandwidth based on a number of calls for the ATM connection and an estimated bandwidth per call. The estimated bandwidth per call corresponds to a maximum bandwidth required for a call. After determining the first bandwidth to request for the ATM connection, the gateway device transmits a request for an ATM connection to the communication device. The request for an ATM connection identifies the first bandwidth requested. The communication device receives the request for the ATM connection, and responsive to the request, the communication device determines if it may allocate the ATM connection. The communication device first determines an overbooking factor for the link over which the ATM connection will be allocated. Once the overbooking factor is determined, the communication device adjusts the first bandwidth requested based on the overbooking factor to determine a second bandwidth. The communication device then determines if the link has at least the second bandwidth available. If the link has at least the second bandwidth available, then the communication device indicates that the ATM connection may be allocated for the second bandwidth. If the link does not have at least the second bandwidth available, then the communication device indicates that the ATM connection may not be allocated for the second bandwidth.

The invention may include other embodiments described below.

DESCRIPTION OF THE DRAWINGS

The same reference number represents the same element on all drawings.

DETAILED DESCRIPTION OF THE INVENTION

Figure 1:
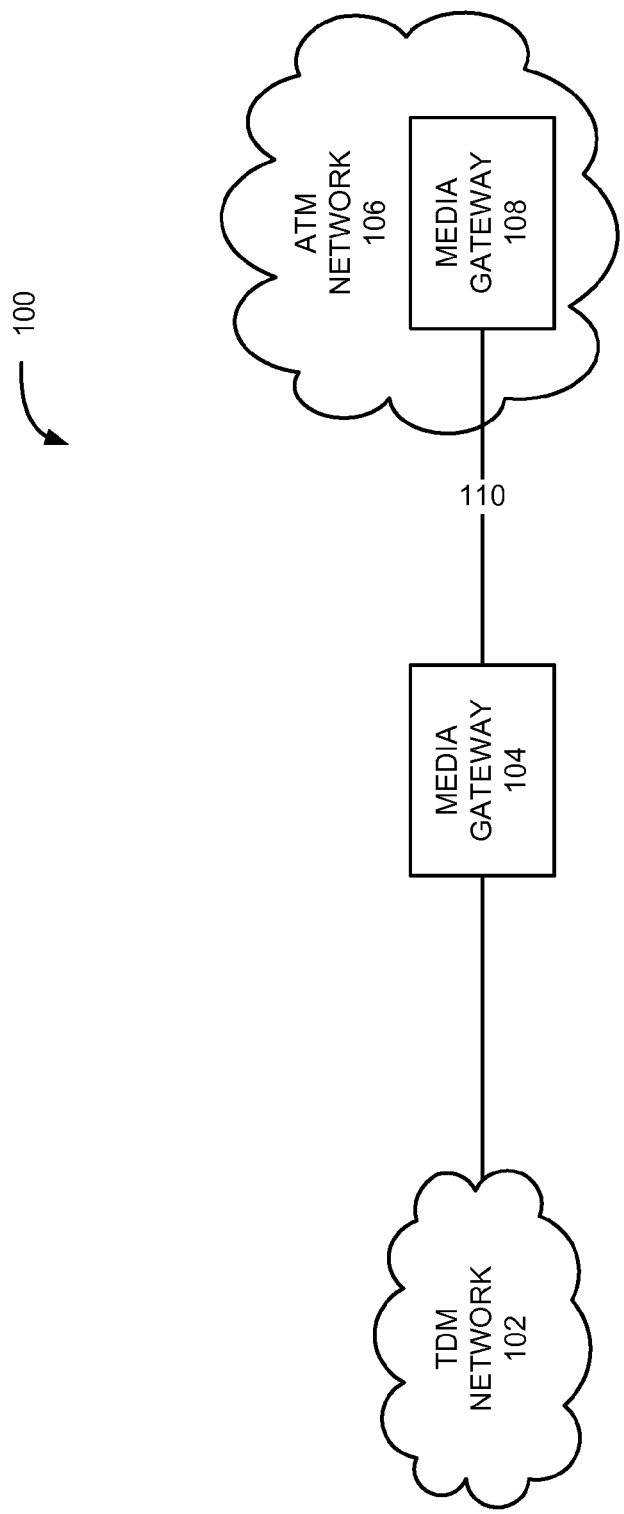
FIG. 1 illustrates a communication system in the prior art.

Prior Art—FIG. 1

FIG. 1 illustrates a communication system 100 in the prior art. Communication system 100 includes a Time Division Multiplexing (TDM) network 102, a media gateway 104, and an Asynchronous Transfer Mode (ATM) network 106. TDM network 102 is connected to media gateway 104. ATM network 106 includes a media gateway 108 that is coupled to media gateway 104 by a link 110.

Assume that media gateway 104 receives a call from TDM network 102. Media gateway 104 processes the call to determine where to route the call over ATM network 106. In this example, media gateway 104 determines that the call is to be transported to media gateway 108 over link 110. If there is an ATM connection previously allocated between media gateway 104 and media gateway 108 over link 110, then media gateway 104 determines if there is bandwidth available for the call over the ATM connection. If there is bandwidth available for the call, then media gateway 104 converts the call into ATM cells and multiplexes the ATM cells on the ATM connection.

If there is not an ATM connection previously allocated between media gateway 104 and media gateway 108 over link 110, then media gateway 104 needs to request an ATM connection. The following example describes a process of how an ATM connection is requested and allocated in the prior art. The process is described as being performed by media gateway 104, but one or more of the steps may be performed by other systems or network personnel.

To request an ATM connection, media gateway 104 first determines the bandwidth to request for the ATM connection. To determine how much bandwidth to request, media gateway 104 estimates the number of calls that will be multiplexed over the ATM connection. Assume for this example that media gateway 104 estimates that 24 calls will be multiplexed over the ATM connection.

Media gateway 104 will also estimate the average bandwidth per call for the calls being multiplexed over the ATM connection. Normal voice calls in TDM network 102 may use 64 kbps. When the calls are converted to ATM cells, the amount of bandwidth needed for the calls may decrease depending on silence suppression, encoding, or voice compression used in the conversion. The amount of bandwidth needed for the calls also depends on whether the calls are Constant Bit Rate (CBR) calls, real time Variable Bit Rate (rt-VBR) calls, or non-real time Variable Bit Rate (nrt-VBR) calls. The amount of bandwidth needed for the calls further depends on the number of calls being multiplexed on the ATM connection. Assume for this example that the estimated average bandwidth per call is 20 kbps.

By multiplying the estimated number of calls (24 calls) on the ATM connection and the estimated average bandwidth per call (20 kbps), a low-end estimate of the bandwidth needed for the ATM connection is 480 kbps. The low-end estimate may not be a good estimate for the ATM connection, as one of the 24 calls on the ATM connection may have a much higher bandwidth than estimated average bandwidth. For instance, assume in operation that the low-end estimate is the actual bandwidth allocated to the ATM connection, and media gateway 104 multiplexes 24 calls on the ATM connection. If the $24^{th}$ call multiplexed over the ATM connection is a call needing 80 kbps of bandwidth, such as a fax or modem call, then there will not be enough bandwidth on the ATM connection for the $24^{th}$ call. Because there is insufficient bandwidth on the ATM connection, media gateway 104 will unfortunately drop the $24^{th}$ call.

To solve this problem, media gateway 104 adds additional bandwidth to the low-end estimate to determine the actual bandwidth to request for the ATM connection. Assume that media gateway 104 adds 80 kbps of additional bandwidth to the low-end estimate of 480 kbps to get 560 kbps. The 560 kbps is the actual bandwidth that media gateway 104 will request for the ATM connection. The additional bandwidth builds a safety factor into the actual requested bandwidth so that the ATM connection can handle fax and modem calls, or other calls that exceed the estimated average bandwidth of a call.

After determining the actual bandwidth to request for the ATM connection, media gateway 104 transmits a request for the ATM connection to media gateway 108. The request for the ATM connection indicates the actual bandwidth requested for the ATM connection (560 kbps). Responsive the request, media gateway 108 determines if there is bandwidth available on link 110 for the requested ATM connection. Assume that link 110 is a DS-3 link. A DS-3 link provides a bandwidth of about 43 Mbps. If there is available bandwidth on link 110, then media gateway 108 allocates the ATM connection for media gateway 104. Media gateway 108 also subtracts the bandwidth of the ATM connection (560 kbps) from the available bandwidth on link 110. If there is no available bandwidth on link 110, then media gateway 108 will not allocate the ATM connection and responds to media gateway 104 accordingly.

If media gateway 104 requests multiple ATM connections having a bandwidth of 560 kbps, then link 110 can handle about 76 ATM connections (43 Mbps on link 110 divided by 560 kbps per ATM connection). If media gateway 104 can multiplex 24 calls on each of the 76 ATM connections, then link 110 can handle 1,824 calls (76 ATM connections times 24 calls per ATM connection).

Unfortunately, allocating ATM connections in the manner described above may not be efficient. The statistical gain achieved in an individual ATM connection is dependent on the number of calls assumed for that ATM connection. The more calls being placed over the ATM connection, the higher the statistical gain, and the fewer calls being placed over the ATM connection, the lower the statistical gain. In this prior art method of allocating ATM connections, the estimated average bandwidth per call that is used to determine the bandwidth to request for the ATM connection is dependent on the number of calls assumed for that ATM connection. For instance, the 20 kbps estimated bandwidth per call depends on the number of calls to be multiplexed on the ATM connection. If the number of calls goes down, then the estimated bandwidth may go up to 25 kbps, 30 kbps, etc. It may be advantageous to allocate ATM connections where the statistical gain is not dependent on the number of calls.

DESCRIPTION OF THE INVENTION

Figure 2:
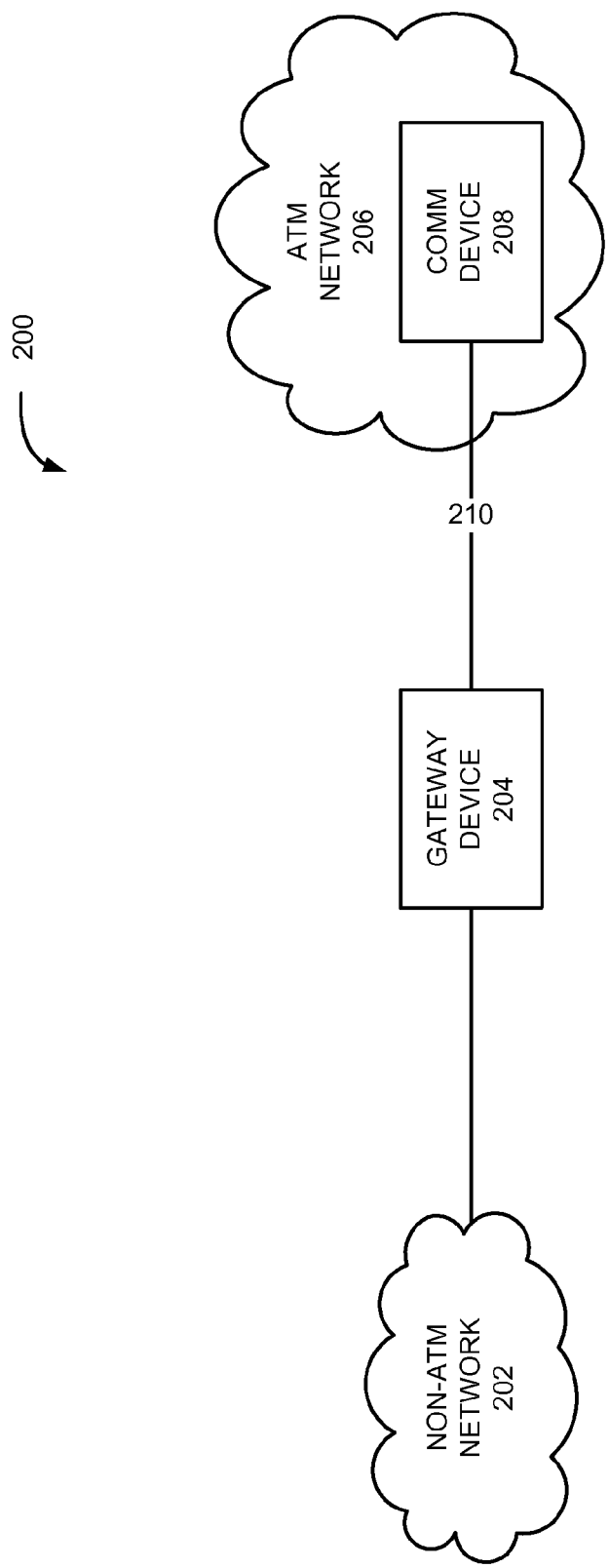
FIG. 2 illustrates a communication system in an exemplary embodiment of the invention.
Figure 3:
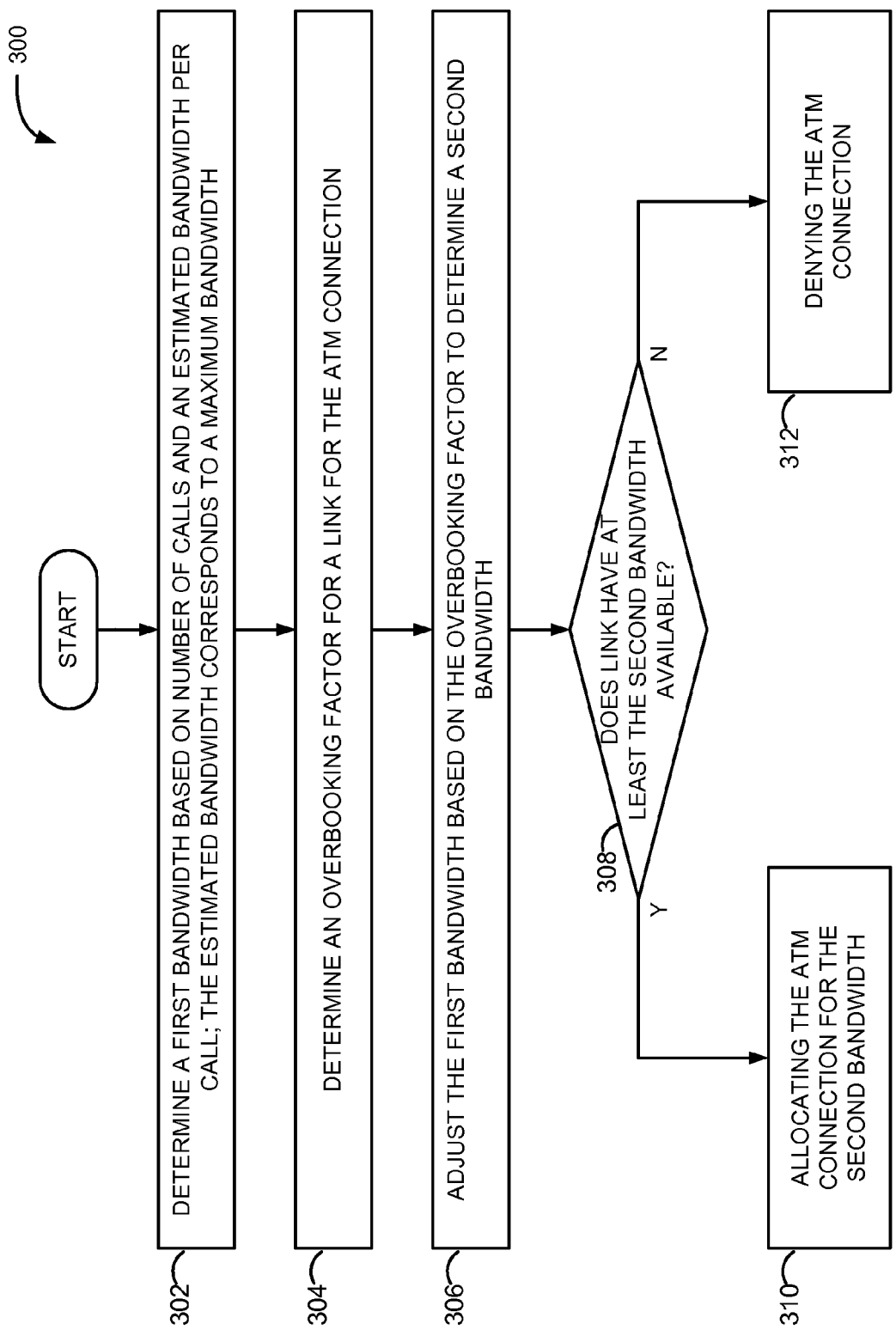
FIG. 3 is a flow chart illustrating a method of allocating ATM connections in an exemplary embodiment of the invention.

FIGS. 2-3 and the following description depict specific embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Communication System—FIG. 2

FIG. 2 illustrates a communication system 200 in an exemplary embodiment of the invention. Communication system 200 includes a non-ATM network 202, a gateway device 204, and an ATM network 206. Non-ATM network 202 is connected to gateway device 204. ATM network 206 includes a communication device 208 that is coupled to gateway device 204 by a link 210. Link 210 may be a DS-3, an OC-3, an OC-12, an OC-48, or some other link. Communication system 200 may include other devices or networks not shown for the sake of brevity.

Non-ATM network 202 comprises any network not based on ATM protocol, such as a TDM network. Gateway device 204 comprises any device, system, or component configured to convert communications between networks using different protocols. Examples of gateway device 204 include a media gateway and/or a gateway controller. Communication device 208 comprises any device, system, or component configured to communicate using ATM protocol, such as an ATM switch or another gateway device.

Assume that gateway device 204 receives a call from non-ATM network 202. Gateway device 204 processes the call and determines that the call should be routed to communication device 208. Gateway device 204 further determines that there is not an ATM connection allocated for routing the call. The following operation describes how an ATM connection may be allocated in communication system 200.

First, gateway device 204 determines a first bandwidth to request for the ATM connection. Gateway device 204 determines the first bandwidth based on a number of calls for the ATM connection and an estimated bandwidth per call. The estimated bandwidth per call corresponds to a maximum bandwidth required for a call. For instance, a fax call or a modem call will need more bandwidth than a regular voice call, as there may be no silence in a fax or modem call. Thus, a maximum bandwidth required for a call may be the bandwidth required for a fax or modem call. With a maximum bandwidth identified, the estimated bandwidth corresponds to the maximum bandwidth by being approximately equal to the maximum bandwidth or within an acceptable range of the maximum bandwidth. The number of calls for the ATM connection may be the number of calls that gateway device 204 estimates will be multiplexed on the ATM connection. After determining the first bandwidth to request for the ATM connection, gateway device 204 transmits a request for an ATM connection to communication device 208. The request for an ATM connection identifies the first bandwidth requested.

Communication device 208 receives the request for the ATM connection. Responsive to the request, communication device 208 determines if it may allocate the ATM connection. Communication device 208 first determines an overbooking factor for link 210. The overbooking factor may be determined in a conventional manner based on how much link 210 is to be "overbooked". The overbooking factor may be based on silence suppression, encoding, voice compression, or another factor. Once the overbooking factor is determined, communication device 208 adjusts the first bandwidth requested based on the overbooking factor to determine a second bandwidth. Communication device 208 then determines if link 210 has at least the second bandwidth available. If link 210 has the second bandwidth available, then communication device 208 indicates that the ATM connection may be allocated for the second bandwidth. If link 210 does not have the second bandwidth available, then communication device 208 indicates that the ATM connection may not be allocated for the second bandwidth.

The operation described by gateway device 204 and communication device 208 shows just one embodiment of the invention. One or more parts of the operation of gateway device 204 and communication device 208 may be performed by network personnel, a control center, or another system, which are considered part of gateway device 204 or communication device 208 in this embodiment.

Method of Allocating ATM Connections—FIG. 3

FIG. 3 is a flow chart illustrating a method 300 of allocating ATM connections embodying the invention. FIG. 2 illustrates an example of a communication system 200 where method 300 may be performed. Assume that gateway device 204 receives a call from non-ATM network 202. Gateway device 204 processes the call and determines that the call should be routed to communication device 208. Gateway device 204 further determines that there is not an ATM connection allocated for routing the call. Method 300 describes a process on how an ATM connection may be allocated in communication system 200.

For method 300, step 302 includes determining a first bandwidth for the ATM connection based on a number of calls for the ATM connection and an estimated bandwidth per call. The estimated bandwidth per call corresponds to a maximum bandwidth required for a call. For instance, a fax call or a modem call will need more bandwidth than a regular voice call, as there may be no silence in a fax or modem call. Thus, a maximum bandwidth required for a call may be the bandwidth required for a fax or modem call. With a maximum bandwidth identified, the estimated bandwidth corresponds to the maximum bandwidth by being approximately equal to the maximum bandwidth or within an acceptable range of the maximum bandwidth. The number of calls for the ATM connection may be the number of calls that will be multiplexed on the ATM connection. Step 304 includes determining an overbooking factor for the link over which the ATM connection will be allocated (such as link 210 in FIG. 2). The overbooking factor may be determined in a conventional manner based on how much the link is to be "overbooked". The overbooking factor may be based on silence suppression, encoding, voice compression, or another factor. Step 306 includes adjusting the first bandwidth based on the overbooking factor to determine a second bandwidth. Step 308 includes determining if the link has at least the second bandwidth available. Step 310 includes allocating the ATM connection for the second bandwidth if the link has the second bandwidth available. Step 312 includes denying the ATM connection if the link does not have the second bandwidth available.

One or more steps of method 300 may be performed by elements in FIG. 2, such as gateway device 204 or communication device 208, or by network personnel, a control center, some other device or system.

EXAMPLE

The following example describes how method 300 may be used to allocate an ATM connection. First, the bandwidth to request for the ATM connection needs to be determined. To determine how much bandwidth to request, step 302 may include estimating the number of calls that will be multiplexed over the ATM connection. Assume for this example that the estimate of the number of calls to be multiplexed over the ATM connection is 24 calls. Step 302 may also include estimating a maximum bandwidth for any call that will be multiplexed over the ATM connection. For instance, a fax call or a modem call will need more bandwidth than a regular voice call, as there may be no silence in a fax or modem call. Thus, the maximum bandwidth may be set based on the bandwidth needed for a fax or modem call. Assume for this example that the estimate of the maximum bandwidth for a call is 80 kbps. By multiplying the number of calls to be multiplexed over the ATM connection (24) and the maximum bandwidth for a call (80 kbps), the result is an initial bandwidth to request for the ATM connection, which is 1,900 kbps (24 calls times 80 kbps). The estimate of the maximum bandwidth per call does not depend on the number of calls to be multiplexed over the ATM connection, as the estimated average bandwidth per call is in the prior art. The estimate of the maximum bandwidth per call in the invention stays the same no matter how many calls are on the ATM connection.

Next, step 304 includes determining an overbooking factor for the link over which the ATM connection will be allocated (such as link 210 in FIG. 2). The overbooking factor may be determined in a conventional manner based on how much the link is to be "overbooked". Assume for this example that the link may be overbooked by a factor of 4. Step 306 may include adjusting the initial bandwidth by dividing the initial bandwidth by the overbooking factor. By dividing the initial bandwidth (1,900 kbps) by the overbooking factor (4), the result is an actual bandwidth to request for the ATM connection, which is 480 kbps (1,900 kbps/4).

After determining the actual bandwidth to request for the ATM connection, step 308 includes determining if the link has at least the actual bandwidth (480 kbps) available. Assume that the link is a DS-3 link. A DS-3 link has a bandwidth of about 43 Mbps. If there is available bandwidth on the DS-3 link, then step 310 includes allocating the ATM connection for 480 kbps if the DS-3 link has at least 480 kbps available. Method 300 may further include subtracting the 480 kbps from the available bandwidth on the DS-3 link to get a new available bandwidth for the DS-3 link. If there is not 480 kbps available on the DS-3 link, then step 312 includes denying the ATM connection.

If multiple ATM connections are requested having a bandwidth of 480 kbps, then the DS-3 link can handle 89 ATM connections (43 Mbps on the DS-3 link divided by 480 kbps per ATM connection). If 24 calls can be multiplexed on each of the 89 ATM connections, then the DS-3 link can handle 2,136 calls (89 ATM connections times 24 calls per ATM connection).

In comparison to the prior art method of allocating ATM connections, the prior art can only allocate 76 ATM connections on a DS-3 link, where 89 ATM connections may be allocated on a DS-3 link according to method 300. Also, in the prior art, only 1,824 calls may be multiplexed on a DS-3 link, while in contrast 2,136 calls may be allocated on a DS-3 link according to method 300. Consequently, method 300 allocates ATM connections in an improved manner to more efficiently utilize the bandwidth of a link.

What is claimed is:

1. A method of allocating an ATM connection over a link of an ATM network, the method comprising:
   determining a first bandwidth for the ATM connection based on a number of calls for the ATM connection and an estimated bandwidth per call, wherein the estimated bandwidth per call corresponds to a maximum bandwidth required for a call;
   determining an overbooking factor for the link;
   adjusting the first bandwidth for the ATM connection based on the overbooking factor to determine a second bandwidth for the ATM connection, wherein the first bandwidth for the ATM connection is divided by the overbooking factor to determine the second bandwidth for the ATM connection;
   determining if the link has at least the second bandwidth available; and
   allocating the ATM connection for the second bandwidth if the link has at least the second bandwidth available.

2. The method of claim 1, further comprising:
   denying the ATM connection for the second bandwidth if the link does not have at least the second bandwidth available.

3. The method of claim 1, wherein the estimated bandwidth per call comprises a maximum bandwidth for a call.

4. The method of claim 1, wherein the estimated bandwidth per call comprises the bandwidth for a fax call.

5. The method of claim 1, wherein the maximum bandwidth per call comprises the bandwidth for a modem call.

6. The method of claim 1, further comprising:
   subtracting the second bandwidth from an available bandwidth on the link to get a new available bandwidth on the link.

7. The method of claim 1, wherein the overbooking factor is based on at least one of silence suppression, encoding, and voice compression.

8. The method of claim 1, wherein the link comprises at least one of a DS-3 link, an OC-3 link, an OC-12 link, and an OC-48 link.

9. The method of claim 1, wherein the communication device comprises another gateway device.

10. A communication system for allocating an ATM connection over a link of an ATM network, the communication system comprising:
    a gateway device connected to the ATM network and configured to determine a first bandwidth for the ATM connection based on a number of calls for the ATM connection and an estimated bandwidth per call, wherein the estimated bandwidth per call corresponds to a maximum bandwidth required for a call, and transmit a request for the ATM connection that indicates the first bandwidth for the ATM connection; and
    a communication device in the ATM network that is coupled to the gateway device by the link and configured to receive the request for the ATM connection, determine an overbooking factor for the link, adjust the first bandwidth for the ATM connection based on the overbooking factor to determine a second bandwidth for the ATM connection, dividing the first bandwidth for the ATM connection by the overbooking factor to determine the second bandwidth for the ATM connection, determine if the link has at least the second bandwidth available, and indicate that the ATM connection can be allocated for the second bandwidth if the link has at least the second bandwidth available.

11. The communication system of claim 10, wherein the communication device is configured to:
    indicate that the ATM connection cannot be allocated for the second bandwidth if the link does not have at least the second bandwidth available.

12. The communication system of claim 10, wherein the estimated bandwidth per call comprises a maximum bandwidth for a call.

13. The communication system of claim 10, wherein the estimated bandwidth per call comprises the bandwidth for a fax call.

14. The communication system of claim 10, wherein the estimated bandwidth per call comprises the bandwidth for a modem call.

15. The communication system of claim 10, wherein the communication device is configured to:
    subtract the second bandwidth from an available bandwidth on the link to get a new available bandwidth on the link.

16. The communication system of claim 10, wherein the overbooking factor is based on at least one of silence suppression, encoding, and voice compression.

17. The communication system of claim 10, wherein the link comprises at least one of a DS-3 link, an OC-3 link, an OC-12 link, and an OC-48 link.

18. The communication system of claim 10, wherein the communication device comprises another gateway device.

* * * * *